(12) United States Patent
Vetter

(10) Patent No.: US 11,446,747 B2
(45) Date of Patent: Sep. 20, 2022

(54) SYSTEMS AND METHODS FOR CALCULATING USAGE OF POWER TOOLS WITH A SENSOR TAG

(71) Applicant: Hilti Aktiengesellschaft, Schaan (LI)

(72) Inventor: Marc Vetter, Zürich (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/073,734

(22) Filed: Oct. 19, 2020

(65) Prior Publication Data

US 2021/0121967 A1  Apr. 29, 2021

Related U.S. Application Data

(60) Provisional application No. 62/927,178, filed on Oct. 29, 2019.

(51) Int. Cl.
*B23B 45/02* (2006.01)
*B23B 45/00* (2006.01)

(52) U.S. Cl.
CPC ............ *B23B 45/02* (2013.01); *B23B 45/003* (2013.01)

(58) Field of Classification Search
CPC ........ A61B 45/02; B25B 45/003; B23B 45/02
USPC ........................................................ 173/217
See application file for complete search history.

(56) References Cited

U.S. PATENT DOCUMENTS

| | | | | |
|---|---|---|---|---|
| 9,367,062 B2* | 6/2016 | Volpert | ...................... | B25F 5/00 |
| 9,756,402 B2* | 9/2017 | Stampfl | ................... | B25B 21/00 |
| 9,900,967 B2* | 2/2018 | Isaacs | ........................ | B25F 5/02 |
| 10,237,742 B2* | 3/2019 | Zeiler | ................... | H04W 4/029 |
| 10,345,797 B2* | 7/2019 | Conrad | .................. | G05D 23/00 |
| 10,408,884 B2* | 9/2019 | Willey | ................. | G01R 31/371 |
| 11,014,224 B2* | 5/2021 | Dey, IV | .................. | B25F 5/006 |
| 11,100,596 B2* | 8/2021 | Erestam | ........... | G06Q 10/06314 |
| 2014/0107853 A1* | 4/2014 | Ashinghurst | ............. | B25F 5/00 700/297 |
| 2019/0061028 A1 | 2/2019 | Martinsson et al. | | |
| 2021/0266718 A1* | 8/2021 | Vetter | ........................ | B25F 5/00 |
| 2021/0384741 A1* | 12/2021 | Douglas | .............. | H02J 7/00034 |

\* cited by examiner

*Primary Examiner* — Michelle Lopez
(74) *Attorney, Agent, or Firm* — Leydig, Voit & Mayer, Ltd.

(57) ABSTRACT

A method includes measuring raw sensor information of a tool over a period of time with a sensor tag coupled to an external surface of the tool. The method also includes determining one or more events of the tool based on the raw sensor information and calculating an aggregate time for each type of event from the one or more events determined over the period of time. The method also includes wirelessly transmitting a history of the one or more events from the sensor tag to a remote computing device. The history comprises the aggregate time for each type of event from the one or more types of events over the period of time.

19 Claims, 4 Drawing Sheets

SYSTEMS AND METHODS FOR CALCULATING USAGE OF POWER TOOLS WITH A SENSOR TAG

CROSS-REFERENCE TO RELATED APPLICATIONS

This application claims the benefit of U.S. Provisional Patent Application No. 62/927,178, filed Oct. 29, 2019, which is incorporated by reference.

BACKGROUND

The present disclosure relates generally to the field of power tools, and more particularly to detecting usage activity within power tools with a sensor tag.

Construction tools, such as corded and cordless power tools, measuring devices, direct fastening tools, diamond cutting tools, soil compaction devices, and others, may be useful in typical construction job sites. Typically, electrical construction tools include a motor drive and control circuitry for controlling the motor drive. In certain situations, it may be beneficial to have historical, current, or future information about the movement or usage of the construction tools. However, not all construction tools may be equipped for measuring and/or recording such historical, current or future information about the movement or usage of the tool. Further, the construction tools may not be enabled with communication features to transmit such information to an external computing device. Accordingly, it is beneficial to provide for systems and methods for measuring, recording, and analyzing a movement or a use of a tool over a period of time. Further, it is beneficial to provide for systems and methods for communicating the measured, recorded, and analyzed information to an external computing device.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a method includes measuring raw sensor information of a tool over a period of time with a sensor tag coupled to an external surface of the tool. The method also includes determining one or more events of the tool based on the raw sensor information and calculating an aggregate time for each type of event from the one or more events determined over the period of time. The method also includes wirelessly transmitting a history of the one or more events from the sensor tag to a remote computing device. The history comprises the aggregate time for each type of event from the one or more types of events over the period of time.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
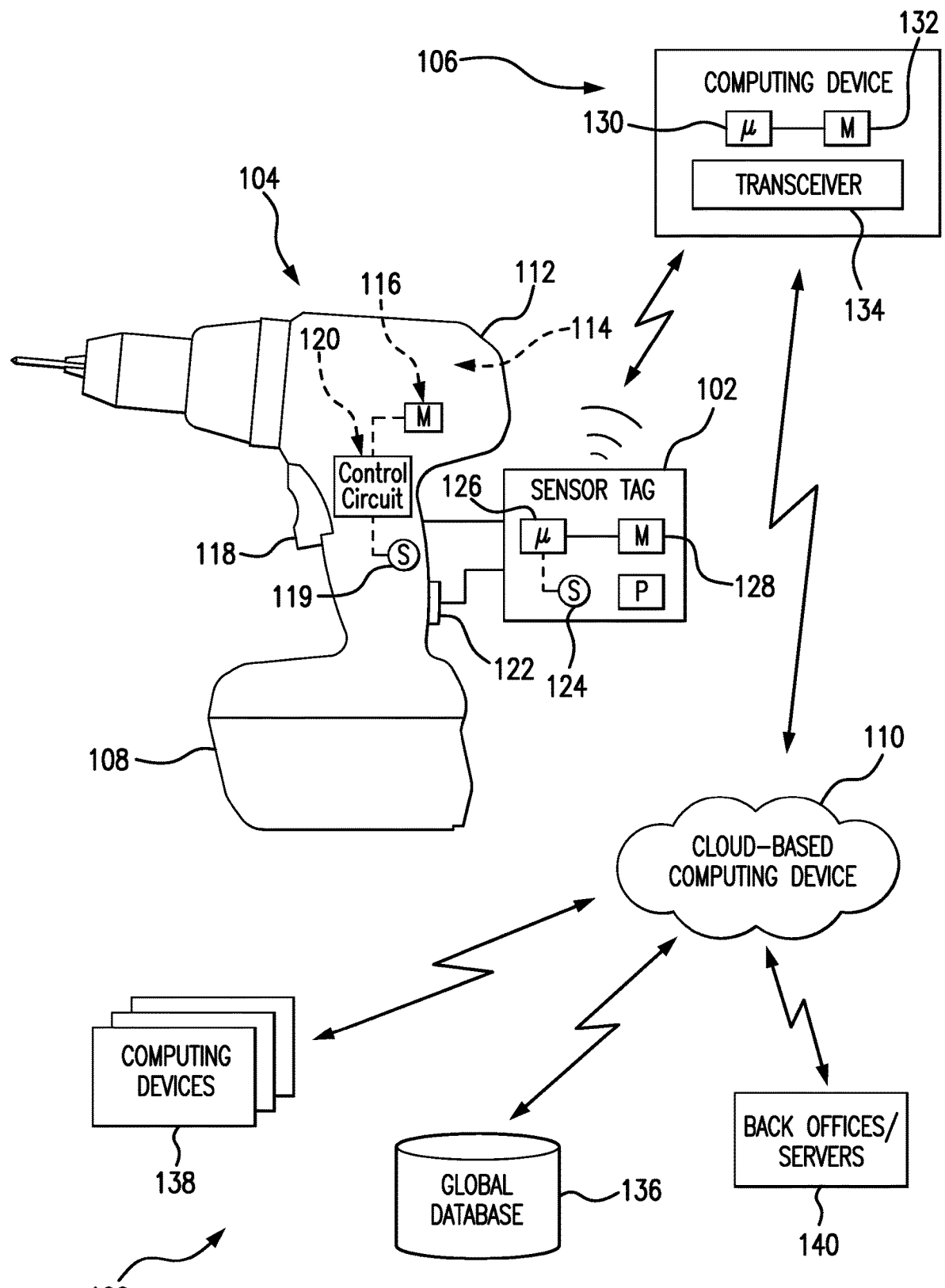
FIG. 1 is a schematic of an embodiment of a tool system, where the tool system includes a sensor tag coupled to a power tool, and where the sensor tag is configured to gather raw sensor information related to the power tool and/or the sensor tag.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In certain embodiments of the present disclosure, a tool system may include systems and methods for a sensor tag removably coupled to a construction tool. For the purposes of the following illustrated embodiments, the construction tool of the tool system is a power tool (e.g., corded or cordless). However, it should be noted that the construction tool may be any type of power tool (e.g., rotary hammers, drives, screw drivers, saws, grinders, etc.), measuring device (e.g., detection tools, lasers, layout tools, surveying equipment, etc.), direct fastening tool, diamond cutting and drilling tool, or any other tool utilized on a construction site.

In certain embodiments, the sensor tag may be attached to an external surface of a housing of the power tool. The sensor tag may include a processor, memory, and one or more sensors (e.g., clock, accelerometer, gyroscope, magnet sensor, position and/or orientation sensor, touch sensor, pressure sensor, force sensors, speed sensor, safety sensor, temperature sensor, proximity and displacement sensor, level sensor, etc.). In particular, the sensor tag may be configured to measure raw sensor information (e.g., touch, pressure, position, orientation, speed, distance, height, acceleration, vibration, etc.) related to the movement of the sensor tag and/or power tool. In certain embodiments, this raw sensor information may be analyzed and used to determine various historical, future, or current parameters related to the power tool. For example, the raw sensor information may be analyzed to determine historical information (e.g., usage statistics) related to the power tool, such as the total time over a period (e.g., lifetime of the tool) that the power tool in an idle mode, a transportation mode, a usage mode, a storage mode, and so forth. In certain embodiments, the raw sensor information may be analyzed and used to anticipate future maintenance, logistics, repairs, or tracking of the power tool. In certain embodiments, the raw sensor information may be analyzed and used to determine current or real-time (or near real-time) information related to the power tool, to determine a free fall event, damage inflicted on the tool, and/or real-time operational statistics.

In certain embodiments, the historical, future, or current parameters calculated from the raw sensor information may be transferred from the sensor tag to an external computing device and/or cloud services via wireless communications. Further, in certain embodiments, to preserve a battery life of the sensor tag, the sensor tag may be configured to utilize the raw sensor information to determine when to communicatively couple with the external computing system to transfer information. Specifically, the sensor tag may enter a "confirmed location sleep mode" after the sensor tag has established a reliable communication channel with an external computing device and transmitted the information to the external computing device.

Turning now to the drawings, FIG. 1 is schematic of an embodiment of a power tool system 100, where the power tool system 100 includes a retroactive sensor tag 102 coupled to a power tool 104. The retroactive sensor tag 102 may measure and transmit one or more pieces of sensor information related to the power tool 104 to an external computing device 106 and/or a cloud-based computing device 110. In certain embodiments, the retroactive sensor tag 102 may be attached to an external surface 112 of a housing assembly 114 of the power tool 104. In certain embodiments, the retroactive sensor tag 102 may be removably engaged within a housing cavity of the housing assembly 114.

In certain embodiments, the power tool 104 includes a motor 116, a trigger 118, and control circuity 120 that is configured to control one or more tool components of the power tool 104. The power tool 104 may include a variety of sensors 119 (e.g., safety sensors, position and/or orientation sensors, touch sensors, pressure sensors, accelerometers, temperature sensors, proximity and displacement sensors, image sensors, level sensors, gyroscopes, force sensors, speed sensors, etc.) that are configured to facilitate the operation and function of the power tool 104. In the illustrated embodiment, the power tool 104 is a cordless hand-held power tool configured to receive power from a power source 108 (e.g., rechargeable lithium-ion battery pack). However, it should be noted that in certain embodiments, the power tool 104 may use a cord to derive power from a power outlet.

The power source 108 may be removably coupled to the power tool 104 via an interface, and may be configured to provide power to operate the motor 116 of the power tool 104. In certain embodiments, the motor 116 may be any type of electric motor that may receive power from an appropriate source (e.g., electrical, pneumatic, hydraulic, etc.). In the illustrated embodiment, the motor 116 is configured to receive power from the removably coupled power device 108, thereby enabling the power tool 104 with a cordless capability. In certain embodiments, the power tool 104 may receive power from a fixed power source. In certain embodiments, the trigger 118 and the motor 116 may be communicatively coupled to the control circuitry 120, and engaging various functions of the trigger 118 may enable functionality of the power tool 104. For example, engaging the "ON" or "OFF" features of the trigger 118 may provide an input to the control circuitry 120, which in turn may provide a drive signals to the motor 116.

In certain embodiments, the sensor tag 102 may be a retroactive sensor tag, that is attached retroactively to the power tool 104 to provide the functionalities of the sensor tag 102. In certain embodiments, the sensor tag 102 may be disposed inside the housing assembly 114, such that the sensor tag 102 is incorporated within the power tool 104.

In certain embodiments, the sensor tag 102 may be coupled to an external surface 112 of a housing assembly 114 of the power tool 104. In certain embodiments, the sensor tag 102 may be removably engaged within a cavity 122 (e.g., sleeve, compartment, etc.) of the housing assembly 114, such that the cavity 122 is permanently disposed on the external surface 112 of the housing assembly 114. The cavity 122 may be designed to house the sensor tag 102, prevent the sensor tag 102 from accidentally dislodging, and protect the sensor tag 102 from environmental factors or impact. The sensor tag 102 may be configured to adapt to the cavity 122. In certain embodiments, the sensor tag 102 may be attached to the external surface 112 of the housing assembly 114 via an adhesive, a tape, one or more fastening devices, or any form of attachment means that allows the sensor tag to be removably engaged with the housing assembly 114. The sensor tag 102 may be attached anywhere on the external surface 112 of the housing assembly 114.

In certain embodiments, the sensor tag 102 includes one or more sensors 124, a processor 126, and a memory 128. The processor 126 may be configured to execute instructions stored on the memory 128 to carry out the functions of the power tool 104. The memory 128 may be configured to store instructions that are loadable and executable on the processor 126. In the illustrated embodiment, an accelerometer is depicted as the sensor 124 in the sensor tag 102. However, it should be noted that other types of sensors 124 (e.g., clock, accelerometer, gyroscope, magnet sensor, position and/or orientation sensor, touch sensor, pressure sensor, force sensors, speed sensor, safety sensor, temperature sensor, proximity and displacement sensor, level sensor, etc.) may be utilized in the same manner described in the present embodiments. Further, while one accelerometer is illustrated, it should be noted one or more of the same or different types of sensors may be utilized with these present embodiments. In certain embodiments, the accelerometer may be a three-axis accelerometer configured to gather information related to static and dynamic forces.

Accordingly, when the sensor tag 102 is attached to the power tool 104, the sensor 102 may be configured to measure raw sensor information related to the power tool's activity. For example, in certain embodiments, the sensor tag 102 measures information such as movement (e.g., movement intensity), touch, pressure, position, orientation, speed, distance, height, vibrations, acceleration, elevation, and so forth, of the power tool 104. In certain embodiments, the raw sensor information may be associated with time, so that a timeline or chronology of events may be generated. The raw sensor information may be stored within the memory 128 and/or utilized by the processor 126 to generate one or more parameters related to current, historical, or future usage of the power tool 104. For example, the raw information measured by the sensors 124 may be utilized to determine a free-fall time, a free-fall distance (or height), duration of idle time, duration of usage time, duration of transportation time, duration of operational time, or other similar parameters.

In certain embodiments, the sensor tag 102 may include a wireless mode of communication, such as, for example, Bluetooth, Near Field Communication (NFC), Wifi, ZigBee, LoRa, LoRaWAN, Sigfox, Cellular, etc. The sensor tag 102 may be configured to communicate wirelessly with a remote computing device 106 (e.g., smartphone, mobile phone, tablet, desktop computer, other processor enabled device, etc.) to wirelessly transmit information from the sensor tag 102 to the remote computing device 106. In certain embodiments, the sensor tag 102 may be configured to advertise a signal at pre-determined intervals, until a computing device 106 within a pre-determined proximate distance receives the signal and establishes a communication channel with the sensor tag 102. In certain embodiments, the sensor tag 102 may be configured to transmit an information packet with raw information (e.g., movement (e.g., movement intensity), touch, pressure, position, orientation, speed, distance, height, vibrations, acceleration, elevation, etc.) and/or calculated parameters (e.g., height, distance, velocity, force of impact, free-fall distance, free-fall height, usage total time, transportation total time, idle total time, etc.) to the computing device 106.

The remote computing device 106 (e.g., smartphone, computer, tablet, or any process enabled device) may include a processor 130 configured to execute instructions stored on a memory 132. Further, the remote computing device 106 may include a transceiver 134 that is configured to communicate the information received from the sensor tag 102 to a cloud-based computing device 110 via a wired connection or wireless connection. For example, the wireless protocols utilized may include WiFi (e.g., Institute of Electrical and Electronics Engineers [IEEE] 802.11X, cellular conduits (e.g., high speed packet access [HSPA], HSPA+, long term evolution [LTE], WiMax), near field communications (NFC), Bluetooth, personal area networks (PANs), and the like. The cloud-based computing device 110 may be a service provider providing cloud analytics, cloud-based collaboration and workflow systems, distributed computing systems, expert systems and/or knowledge-based systems. In certain embodiments, the cloud-based computing device 110 may be a data repository that is coupled to an internal or external global database 136.

Further, in certain embodiments, the global database 136 may allow computing devices 138 to retrieve information stored within for additional processing or analysis. Indeed, the cloud-based computing device may be accessed by a plurality of systems (computing devices 138 and/or computing devices from back offices/servers 140) from any geographic location, including geographic locations remote from the physical locations of the systems. Accordingly, the cloud 110 may enable advanced collaboration methods between parties in multiple geographic areas, provide multi-party workflows, data gathering, and data analysis, which may increase the wireless capabilities of connectivity of the power tool 104.

In certain embodiments, raw sensor information measured from the sensor tag 102 may be utilized to determine predictive behavior of an operator and/or the power tool 104. For example, in certain embodiments, information gathered by the sensor tag 102 may be utilized to anticipate future maintenance, logistics, repairs, or tracking of the power tool.

For example, based on a measured free-fall event for the power tool 104, the anticipated maintenance for such an event may be determined and stored within the cloud 110. As a further example, based on the history of events (e.g., usage history, maintenance history, measured events, etc.), repairs for worn out parts may be calculated and determined. Based on this information, operators who own the power tool 104 may receive targeted customer service and/or support.

Figure 2:
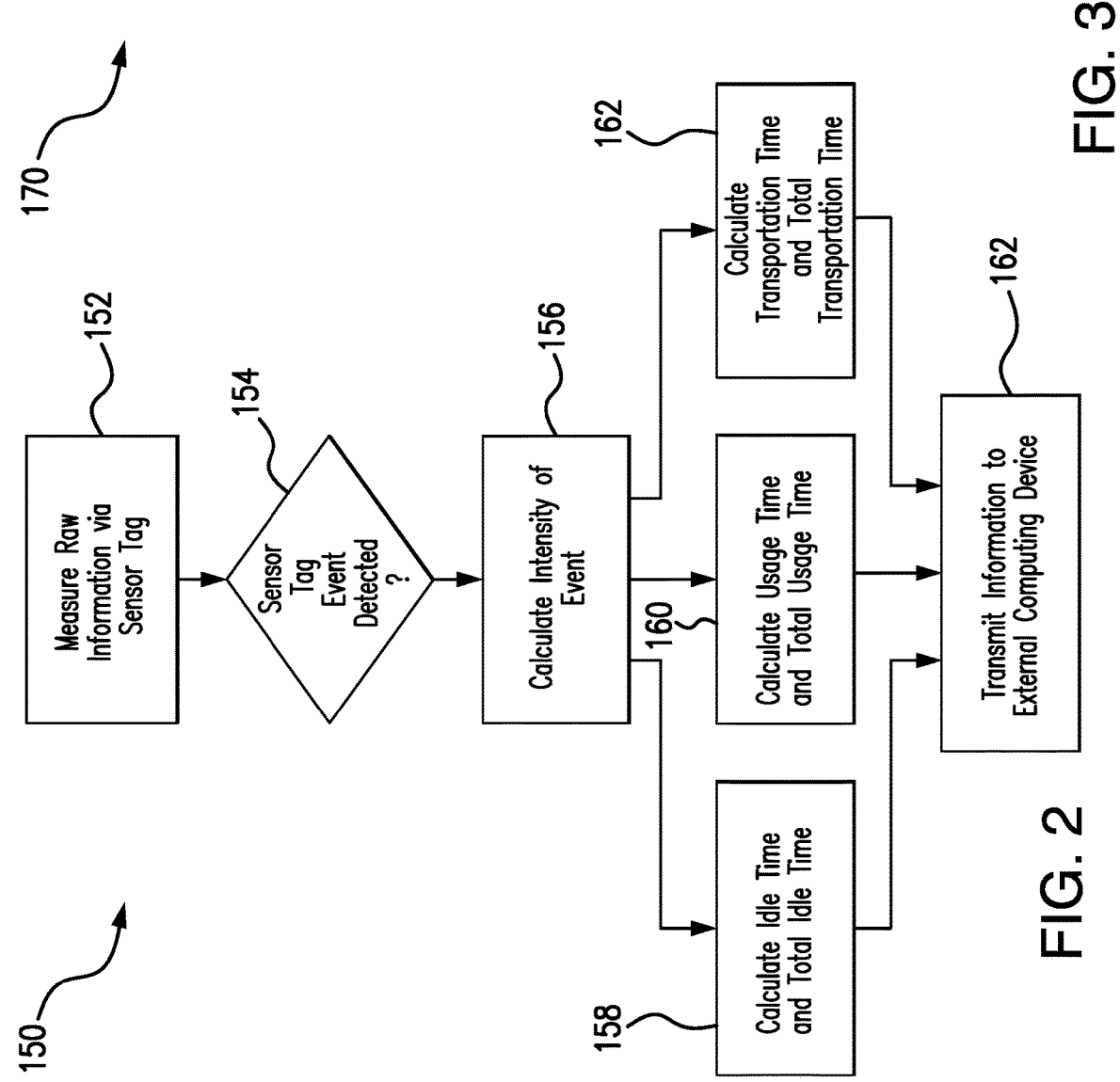
FIG. 2 is a method of an embodiment of the tool system of FIG. 1, where the method includes measuring raw sensor information related to the power tool via the sensor tag to determine one or more events of the power tool over a period of time.

FIG. 2 is a method 150 of an embodiment of the power tool system 100 of FIG. 1, where the method 150 includes measuring raw information from the one or more sensors 124 disposed on the sensor tag 102 (block 152). The raw sensor information may include information related to a movement (e.g., movement intensity), a position, an orientation, a speed, a distance, a height, vibrations, acceleration, elevation, a touch, a pressure, a force, etc. of the power tool 104 and/or the sensor tag 102. In certain embodiments, the raw sensor information may be correlated to a time stamp, such that information may be recorded over a period of time. For example, the raw sensor information may be analyzed to determine historical information (e.g., usage statistics) related to the power tool, such as the total time over a period (e.g., lifetime of the tool) that the power tool in an idle mode, a transportation mode, a usage mode, a storage mode, and so forth.

In certain embodiments, the sensor tag 102 may detect a sensor tag event based on the raw sensor information measured via the one or more sensors 124 (block 154). Specifically, the raw sensor information may be indicative of an event (historical, current, or future) related to the power tool 104 and/or the sensor tag 102. For example, the power tool and/or the sensor tag 102 may be picked up and used by an operator, moved from one location to another, accidentally dropped, transported via a vehicle, put into storage, etc. These types of events may be captured by the one or more sensors 124 of the sensor tag 102. As an example, when an operator touches and moves the power tool 104, the one or more sensors 124 (e.g., accelerometer, touch sensor, pressure sensor, elevation sensor, a position/orientation sensor, a movement sensor, etc.) may capture the event via raw sensor information.

In certain embodiments, the raw sensor information may be stored within the memory 128 and/or analyzed by the processor 126 to determine the type of event. For example, in certain embodiments, the type of event may be determined by calculating the intensity of the captured movement (block 156). Further, based on the calculated intensity, the processor 126 may be configured to determine the type of event (e.g., idle mode, transportation mode, usage mode, etc.).

In certain embodiments, based on the intensity of the motion, the sensor tag 102 may calculate a total duration of the event. For example, a period of no activity after motion is detected may be logged as "idle time," and a total time in "idle mode" may be calculated by the sensor tag 102 (block 158). As a further example, a period of continued activity or operation may be logged as "usage time," and a total time in "usage mode" may be calculated by the sensor tag 102 (block 160). As a further example, a period of activity resembling a tool in transport (e.g., via a car, bus, truck, train, airplane, etc.) may be logged as "transportation time," and a total time in "transportation mode" may be calculated by the sensor tag 102 (block 162). In this manner, the sensor tag 102 may be configured to gather information related to the history of the power tool 104 over a period of time. In certain embodiments, a history of the power tool 104 may be captured and recorded over a lifetime. Furthermore, in certain embodiments, the sensor tag 102 may be configured to transmit the recorded history of the power tool 104 (as stored within the memory 128) to the remote computing device 106 (block 164), as further described with respect to FIGS. 4-5.

Figure 3:
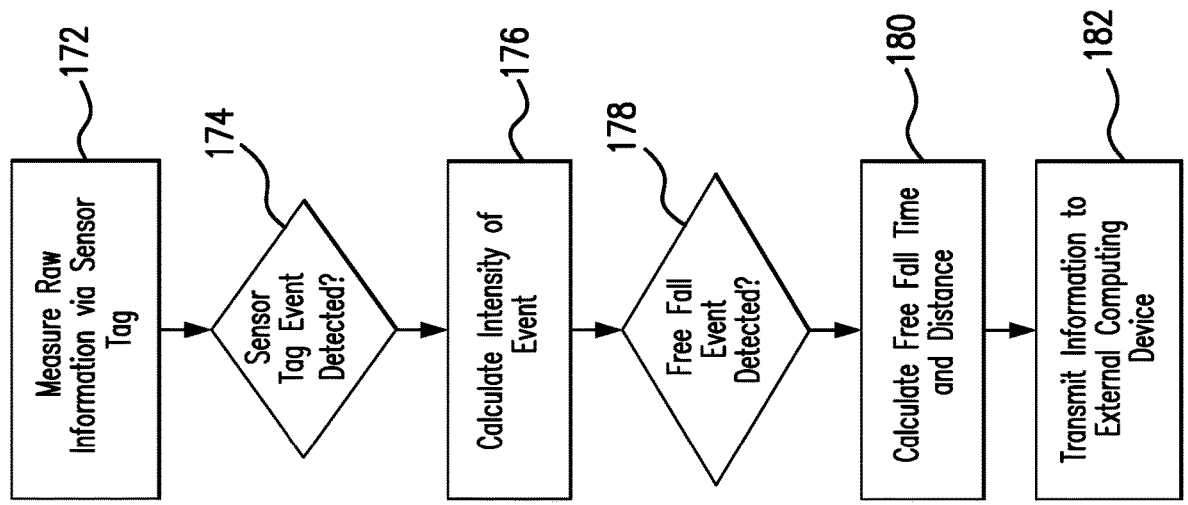
FIG. 3 is a method of an embodiment of the tool system of FIG. 1, where the method includes measuring raw sensor information related to the power tool via the sensor tag to determine a free fall distance and/or a free fall time.

FIG. 3 is a method 170 of an embodiment of the power tool system 100 of FIG. 1, where the method 170 includes measuring raw information from the one or more sensors 124 disposed on the sensor tag 102 (block 172). The raw sensor information may include information related to a movement (e.g., movement intensity), a position, an orientation, a speed, a distance, a height, vibrations, acceleration, elevation, a touch, a pressure, a force, etc. of the power tool 104 and/or the sensor tag 102. In certain embodiments, the sensor tag 102 may detect a sensor tag event within raw sensor information measured via the one or more sensors 124 (block 174). Specifically, the raw sensor information may be indicative of an event (e.g., historical, current, or future) related to the power tool 104 and/or the sensor tag 102. In certain embodiments, the raw sensor information may be analyzed and used to determine current or real-time (or near real-time) information related to the power tool, to determine a free fall event, damage inflicted on the tool, and/or real-time operational statistics.

In certain embodiments, the type of event may be determined by calculating the intensity of the captured movement (block 176). In certain embodiments, the sensor tag 102 may compare the calculated motion intensity with a threshold motion intensity to determine whether the power tool 104 is undergoing a free fall event (block 178). Based on the raw sensor information measured, the sensor tag 102 may be configured to calculate other parameters, such as a free fall time (block 178) and free fall distance or height (block 180). In this manner, the sensor tag 102 may be configured to gather information related to a free fall event of the power tool 104. Furthermore, the sensor tag 102 may be configured to transmit the recorded history of the power tool 104 (as stored within the memory 128) to the remote computing device 106 (block 182).

Figure 4:
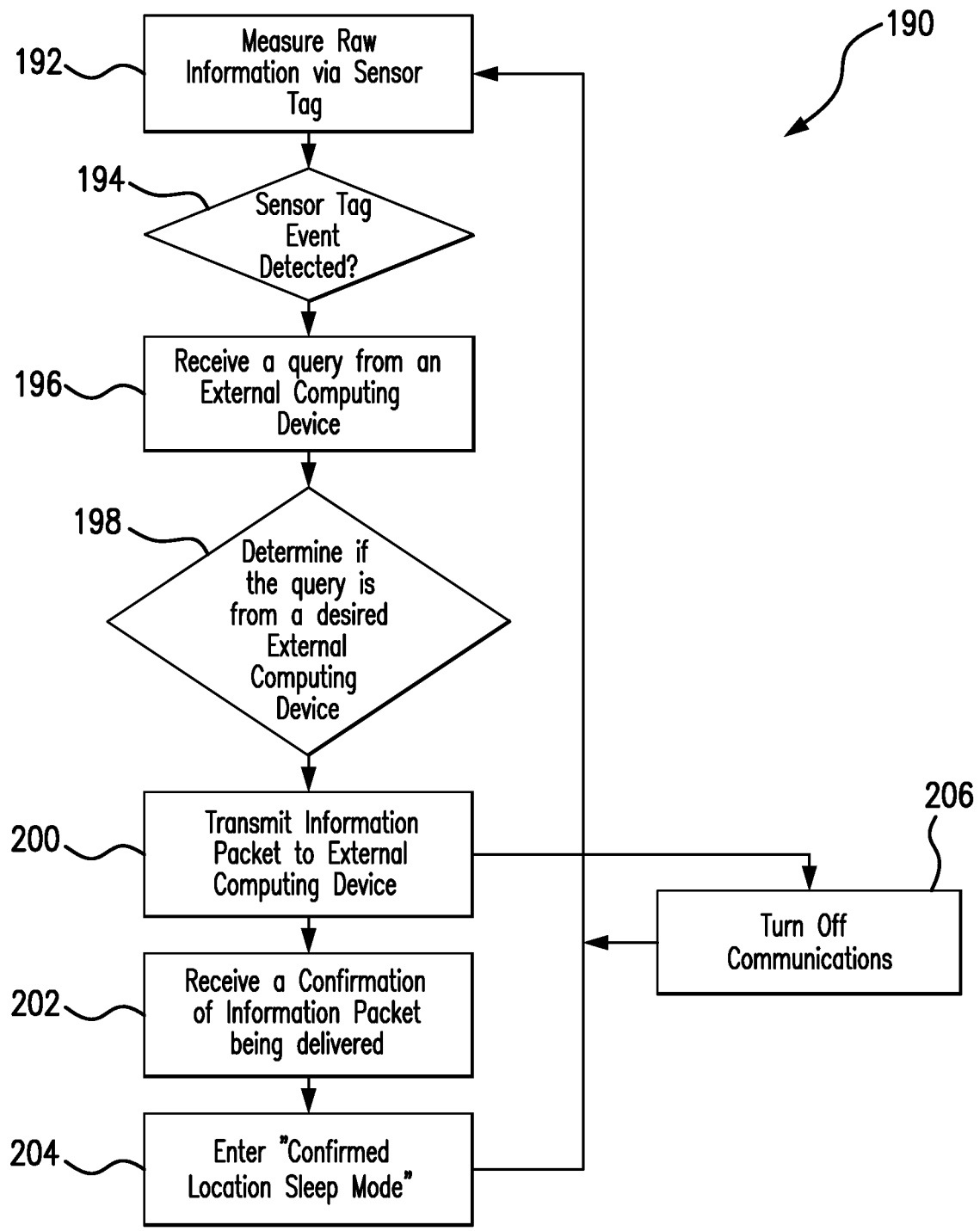
FIG. 4 is a method of an embodiment of the tool system of FIG. 1, where the method includes conserving battery power for the sensor tag by identifying a proximate computing device and entering a confirmed sleep mode.

FIG. 4 is a method 190 of an embodiment of the power tool system 100 of FIG. 1, where the method 190 includes conserving the battery power of the sensor tag 102 by identifying a proximate computing device and entering a confirmed sleep mode. Specifically, the method 190 includes measuring raw sensor information from the one or more sensors 124 disposed on the sensor tag 102 (block 192). In certain embodiments, the method includes detecting, via the processor 126 of the sensor tag 102, a sensor tag event based on the raw sensor information measured via the one or more sensors 124 (block 194).

In certain embodiments, the method 190 includes receiving a query from the external computing device 106, which may be within a pre-determined distance of the sensor tag 102 and/or the power tool 104 (block 196). For example, the sensor tag 102 may be "listening" for an indication of a remote computing device 106 that is within a predetermined distance of the power tool 104. Accordingly, upon receiving the query, the sensor tag 102 may be configured to determine whether the query is from a desired source (block 198). For example, various computing devices may be proximate to the sensor tag 102, but it may not be desirable to send raw sensor information and/or calculated parameters related to the power tool 104 to an undesirable source. Instead, the sensor tag 102 may be configured to transmit information only to a desired source, such as a computing device that is operated by the same or similar entity as that operating the power tool 104.

In certain embodiments, the method includes transmitting an information packet to the remote computing device 106 (block 200). The information packet may include a full or partial history (over a lifetime and/or over a portion of the lifetime of the power tool 104) of the raw sensor information gathered by the sensor tag 102. In certain embodiments, the information packet may include historical, current, or future parameters related to the power tool 104 and/or the sensor tag 102 determined by the sensor based on the raw sensor information. For example, the sensor tag 102 may transmit an information packet to the computing device 106 having information related to a free-fall event that was determined seconds, minutes, days, or years in the past. After transmitting one or more packets of information, the sensor tag 102 may receive a confirmation of delivery from the remote computing device 106 (block 202).

In certain embodiments, upon receiving a confirmation of the delivery of the data packet, the sensor tag 102 may enter a "confirmed location sleep mode"—and may turn off all external communications (block 204). Specifically, the confirmed location sleep mode allows the sensor tag to conserve energy that might otherwise be spent continuously advertising its location (e.g., beacon signals) and/or continuously transmitting information packets to the external computing device 106. In certain embodiments, the sensor tag 102 may enter the "confirmed location sleep mode" after transmitting information to an external computing device 106, without waiting for or receiving a confirmation of delivery from the external computing device 106 (block 206).

In certain embodiments, the method 190 includes continuing to measure raw sensor information during the time the sensor tag 102 is in the confirmed location sleep mode (block 192). Furthermore, upon detecting another sensor tag event (block 194), the sensor tag disrupts the confirmed location sleep mode and resumes external communications. In certain embodiments, such an interruption event may be a timeout (20 minutes or more pass after the last transmittal of an information packet), a free fall event and/or one or more pre-determined types of detected movement of the power tool 102. In certain embodiments, the sensor tag 102 may turn external communication "ON" after the interruption of the confirmed location sleep mode, and continue to advertise its location via one or more beacon signals in pre-determined intervals.

Figure 5:
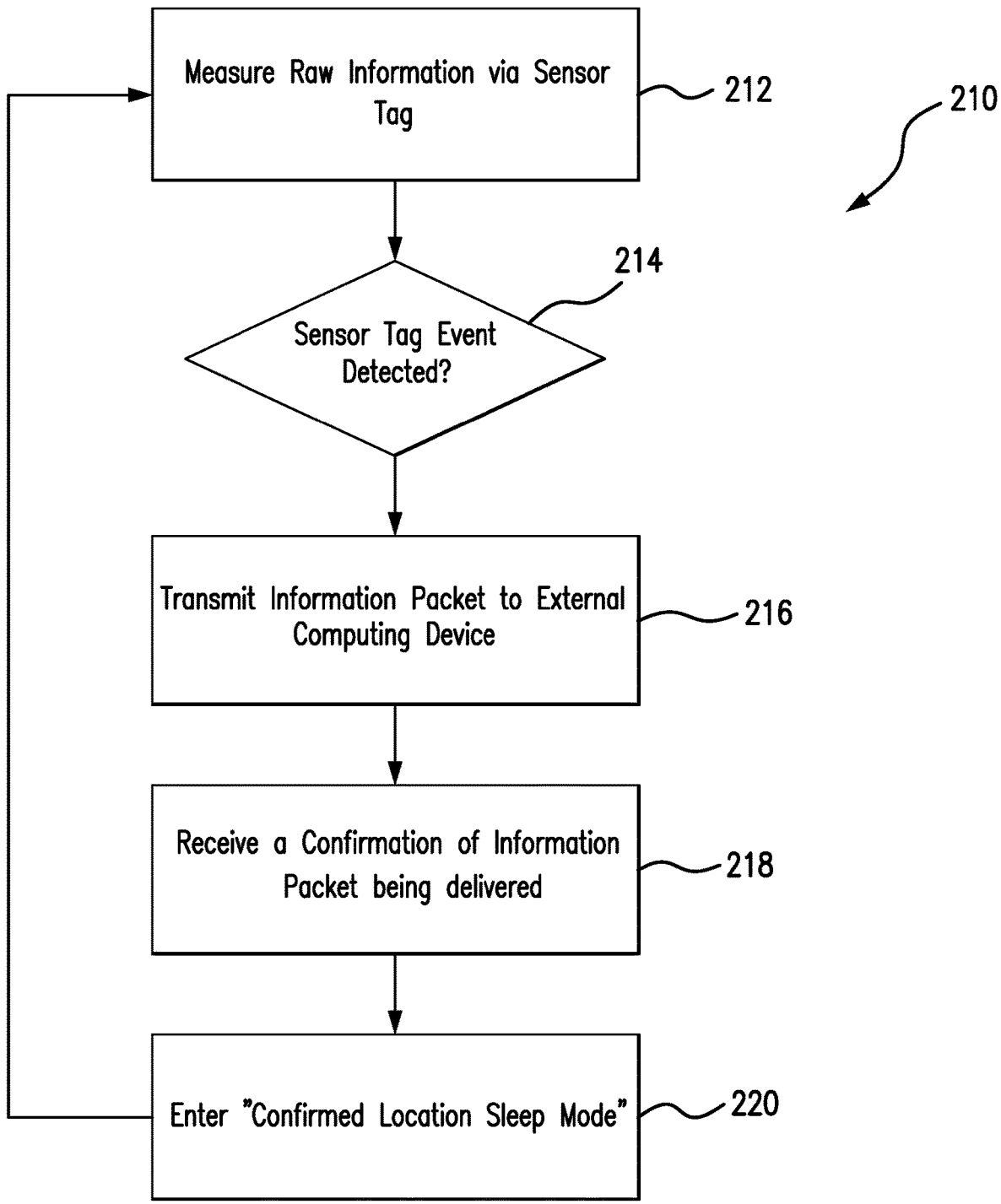
FIG. 5 is a method of an embodiment of the tool system of FIG. 1, where the method includes conserving battery power for the sensor tag by transmitting information to a proximate computing device and entering a confirmed sleep mode.

FIG. 5 is a method of an embodiment of the tool system of FIG. 1, where the method 210 includes conserving battery power for the sensor tag by transmitting information to a proximate computing device and entering a confirmed sleep mode. Specifically, the method 210 includes measuring raw sensor information from the one or more sensors 124 disposed on the sensor tag 102 (block 212). In certain embodiments, during the time that the sensor tag 102 is measuring raw sensor information, the sensor tag 102 may be configured to transmit a beacon signal at pre-determined intervals to identify a proximate remote computing device 106. In certain embodiments, the method includes detecting, via the processor 126 of the sensor tag 102, a sensor tag event based on the raw sensor information measured via the one or more sensors 124 (block 214).

In certain embodiments, upon detecting a sensor event, the method 210 includes transmitting an information packet to the remote computing device 106 (block 216). As noted above, the information packet may include a full or partial history (over a lifetime and/or over a portion of the lifetime of the power tool 104) of the raw sensor information gathered by the sensor tag 102. In certain embodiments, the information packet may include historical, current, or future parameters related to the power tool 104 and/or the sensor tag 102 determined by the sensor based on the raw sensor information. After transmitting one or more packets of information, the sensor tag 102 may receive a confirmation of delivery from the remote computing device 106 (block 218).

In certain embodiments, upon receiving a confirmation of the delivery of the data packet, the sensor tag 102 may enter a "confirmed location sleep mode"—and may turn off all external communications (block 220). Specifically, the confirmed location sleep mode allows the sensor tag to conserve energy that might otherwise be spent continuously advertising its location (e.g., beacon signals) and/or continuously transmitting information packets to the external computing device 106. In certain embodiments, the method 210 includes continuing to measure raw sensor information during the time the sensor tag 102 is in the confirmed location sleep mode (block 212). Furthermore, upon detecting another sensor tag event (block 214), the sensor tag disrupts the confirmed location sleep mode and resumes external communications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A method, comprising:
    measuring raw sensor information of a tool over a period of time with a sensor tag coupled to an external surface of the tool;
    determining one or more events of the tool based on the raw sensor information, wherein the one or more events comprises an idle event, a usage event, or a transportation event;
    calculating an aggregate time for each of the one or more events determined over the period of time; and
    wirelessly transmitting a history of the one or more events from the sensor tag to a remote computing device, wherein the history comprises the aggregate time for each of the one or more events over the period of time.

2. The method of claim 1, wherein the event comprises an idle event, and wherein the idle event comprises a duration of time during which the tool is idle.

3. The method of claim 1, wherein the event comprises a usage event, and wherein the usage event comprises a duration of time during which the tool is utilized by an operator.

4. The method of claim 1, wherein the event comprises a transportation event, and wherein the transportation event comprises a duration of time during which the tool is transported from one location to another.

5. The method of claim 1, wherein the remote computing device is a smartphone, a mobile phone, a tablet, a desktop computer or any processor-enabled device.

6. The method of claim 1, wherein the one or more events of the tool are calculated in real-time.

7. The method of claim 6, wherein the aggregate time for each event is updated in real-time.

8. The method of claim 1, wherein the tool comprises a power tool, a measuring device, a direct fastening tool, a diamond cutting tool, a drilling tool, or any other construction tool.

9. The method of claim 1, wherein the event comprises a usage event, and wherein the aggregate time for the usage event over the period of time is utilized to anticipate future maintenance or repairs for the tool.

10. The method of claim 1, wherein the history comprises usage statistics of the tool over a lifetime of the tool.

11. A system, comprising:
    a sensor tag removably coupled to an external surface of a construction tool, wherein the sensor tag comprises:
        one or more sensors configured to measure raw sensor information of the tool over a period of time;
        a processor configured to calculate an aggregate time for each of one or more events determined over the period of time, wherein the one or more events comprises an idle event, a usage event, or a transportation event; and
        communications circuitry configured to wirelessly transmit a history of the one or more events from the sensor tag to a remote computing device, wherein the history comprises the aggregate time for each of the one or more events over the period of time.

12. The system of claim 11, wherein the construction tool comprises a power tool, a measuring device, a direct fastening tool, a diamond cutting tool, a drilling tool, or any other tool.

13. The system of claim 11, wherein the event comprises an idle event, and wherein the idle event comprises a duration of time during which the tool is idle.

14. The system of claim 11, wherein the event comprises a usage event, and wherein the usage event comprises a duration of time during which the tool is utilized by an operator.

15. The system of claim 11, wherein the event comprises a transportation event, and wherein the transportation event comprises a duration of time during which the tool is transported from one location to another.

16. The system of claim 11, wherein the one or more events of the tool are calculated in real-time.

17. The system of claim 16, wherein the aggregate time for each event is updated in real-time.

18. The method of claim 11, wherein the event comprises a usage event, and wherein the aggregate time for the usage event over the period of time is utilized to anticipate future maintenance or repairs for the tool.

19. The method of claim 11, wherein the history comprises usage statistics of the tool over a lifetime of the tool.

* * * * *